US005790245A

United States Patent [19]

Kanesashi

[11] Patent Number: 5,790,245

[45] Date of Patent: Aug. 4, 1998

[54] PAPER EXAMINING METHOD AND APPARATUS

[75] Inventor: Iwao Kanesashi, Kawagoe, Japan

[73] Assignee: Nippon Conlux Co., Ltd., Tokyo, Japan

[21] Appl. No.: 638,929

[22] Filed: Apr. 25, 1996

[30] Foreign Application Priority Data

May 1, 1995 [JP] Japan .................................... 7-107445

[51] Int. Cl.[6] .............................. G06K 9/74; G01B 11/00

[52] U.S. Cl. ............................................... 356/71; 356/394

[58] Field of Search .............................. 356/71, 394, 444, 356/73; 250/556, 227.1, 227.31, 223 R; 302/7, 17, 18; 194/206, 207; 209/534

[56] References Cited

U.S. PATENT DOCUMENTS 4,184,081 1/1980 Bergamini ................................ 250/556
4,204,765 5/1980 Iannadrea et al. ........................ 356/71
4,429,991 2/1984 Williams .................................. 356/73
4,587,434 5/1986 Roes et al. .............................. 250/556
4,611,345 9/1986 Ohnishi et al. ............................ 382/7
4,723,072 2/1988 Naruse ................................... 235/454
4,881,268 11/1989 Uchida et al. ............................ 382/7
5,014,325 5/1991 Moritomo ................................. 382/7
5,034,616 7/1991 Bercovitz ................................ 250/556
5,199,543 4/1993 Kamagami et al. ..................... 194/207
5,225,688 7/1993 Endo ....................................... 250/560
5,437,357 8/1995 Ota et al. ................................ 194/206
5,542,518 8/1996 Kurosawa et al. ...................... 194/206

*Primary Examiner*—Frank G. Font
*Assistant Examiner*—Michael P. Stafira
*Attorney, Agent, or Firm*—Loeb & Loeb LLP

[57] ABSTRACT

The paper examining apparatus examines the genuineness of a paper, such as a bank note, on the basis of its physical characteristics measured from the various points of the paper. The apparatus includes a carry distance detecting device, such as a rotary encoder, for detecting a carry distance of the paper; a reference value storing device for storing reference values corresponding to the nominal physical characteristics of the paper; a detection point setting device for setting a number and positions of detection points from which the detection values of the paper are detected; and a match detecting device for outputting a match signal whenever a set signal outputted by the detection point setting device matches a detection signal outputted by the carry distance detecting section. The paper examining apparatus also includes a radiating device, such as a light source, and a detection device for measuring the detection values of the paper; a compare device for comparing the detection values with that of the corresponding reference values; and an output device for deciding whether the paper is genuine on the basis of the comparison results of the compare device.

7 Claims, 2 Drawing Sheets

PAPER EXAMINING METHOD AND APPARATUS

BACKGROUND OF THE INVENTION

1. Field of the Invention

The present intention relates to a paper examining method and apparatus, and more specifically to a method and apparatus for deciding whether a sheet of paper is genuine or suspect by examining a physical quantity (e.g., light or magnetism) transmitted through or reflected from a paper to be examined, and by evaluating the transmission rate or reflection rate obtained through or from the paper.

2. Description of the Prior Art

In an automatic vending machine or an automatic service equipment, a paper such as monetary a bill or a card is usually used to pay the charge or the fee. In this case, therefore, it is necessary to accurately discriminate whether the used paper is genuine or counterfeit.

For this purpose, conventionally, a paper has been so far examined by detecting a transmission or reflection rate of a physical quantity obtained through or from the paper. For instance, a transmission rate of magnetism through a magnetic ink printed on the paper is examined. Or else, transmission or reflection characteristics of light through or from the paper are detected by use of an optical sensor.

When the optical characteristics of the paper are detected, the detection positions are determined on the surface of the paper in a form of a lattice, and data are obtained at predetermined positions on the paper, respectively. In this case, since the measurement points are fixed, once the paper examining apparatus has been analyzed by a forger, the measurement points can be inferred, so that it is possible to allow the paper examining apparatus to recognize a counterfeit paper as a genuine paper.

To overcome this problem, when the measurement points are increased all over the surface of the paper, since a huge memory capacity and a high speed processor for processing huge data are required, the apparatus cost inevitably increases.

SUMMARY OF THE INVENTION

With these problems in mind, it is the object of the present invention to provide a paper examining method and apparatus for examining paper at a high precision and at a relatively low cost.

To achieve the above-mentioned object, the present invention provides a paper examining method of examining genuineness of a carried paper on the basis of transmission or reflection characteristics of a physical quantity, and comprises the steps of: setting reference transmission or reflection values of the physical quantity at a plurality of predetermined points on the paper; irradiating the paper with the physical quantity; obtaining transmission or reflection detection values of the physical quantity at a number and positions of detection points selected from predetermined points; reading the reference transmission or reflection values of the physical quantity at the detection points from the set reference transmission or reflection values of the physical quantity; comparing the detected transmission or reflection values at the selected detection points with the reference transmission or reflection values of the physical quantity for each detection point; and deciding the genuineness of the paper on the basis of the comparison results.

Further, the present invention provides a paper examining apparatus for examining genuineness of a carried paper on the basis of transmission or reflection characteristics of a physical quantity, which comprises: carry distance detecting means for detecting a carry distance of the paper; reference value holding means for holding reference transmission or reflection values of the physical quantity set at a plurality of predetermined points on the paper; detection point setting means for setting a number and positions of detection points at which the transmission or reflection values of the physical quantity are to be detected from among the predetermined points on the paper; match detecting means for outputting a match signal whenever a set signal outputted by said detection point setting means matches a detection signal outputted by said carry distance detecting means; physical quantity irradiating means for irradiating the physical quantity upon the paper; physical quantity detecting means for detecting the transmission or the reflection values of the physical quantity obtained through or from the paper; reference value reading means for reading the reference transmission or reflection values at the detection points from among the set reference transmission or reflection values of the physical quantity; comparing means for comparing the detected transmission or reflection values of the physical quantity with the reference transmission or reflection values read by said reference value reading means; and deciding means for deciding whether the paper is genuine or not on the basis of the comparison results of said comparing means.

DETAILED DESCRIPTION OF THE PREFERRED EMBODIMENTS

Figure 1:
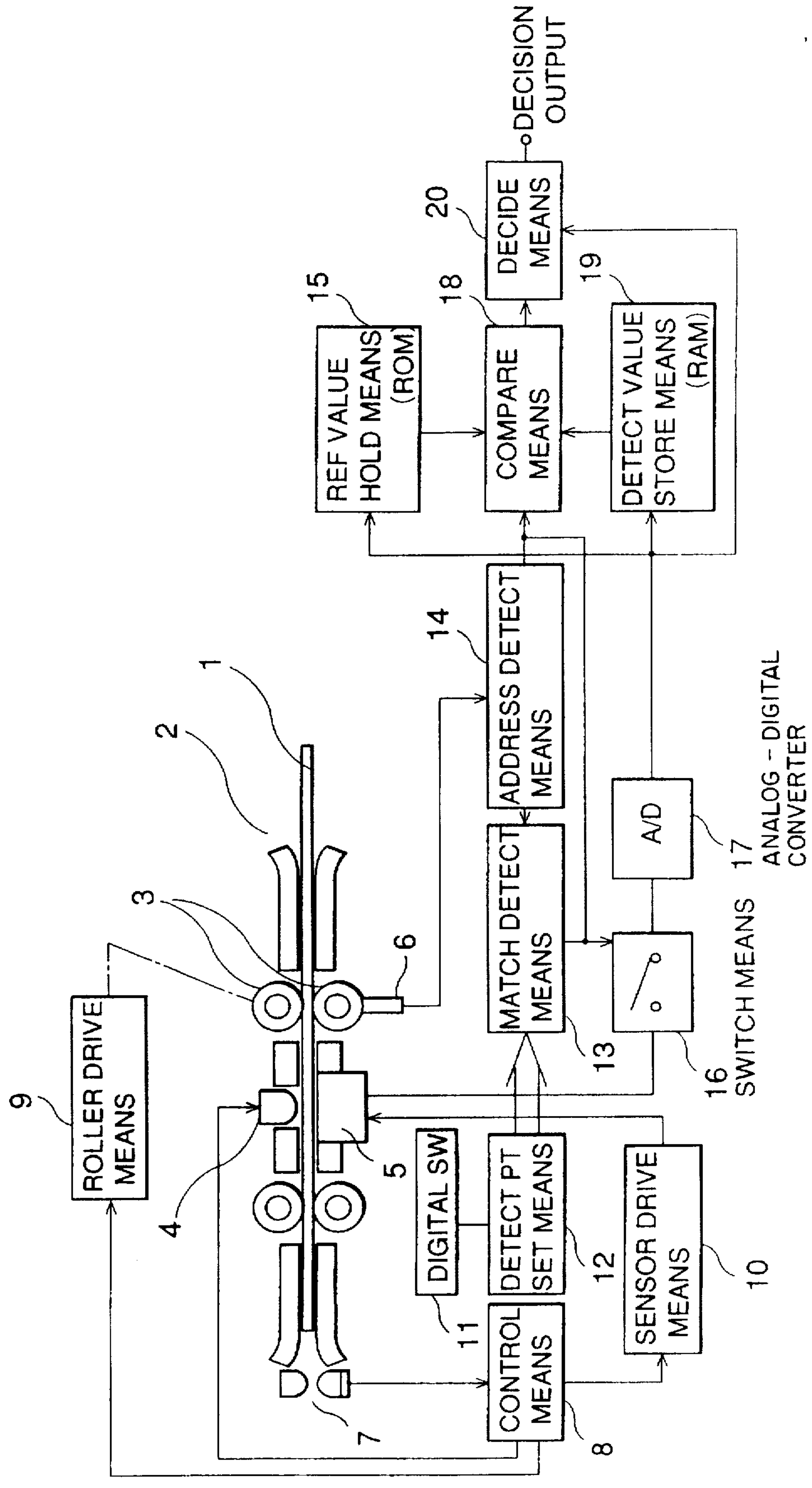
FIG. 1 is a block diagram showing an embodiment of the paper examining apparatus according to the present invention.

An embodiment of the present invention will be described hereinbelow with reference to the attached drawings. FIG. 1 is a block diagram showing the hardware construction of the apparatus according to the present invention. In FIG. 1, a paper 1 is fed along a paper passage 2. The paper passage 2 is constructed by upper and lower paper supporting members. Further, paper carrying means (e.g., two rollers) is disposed midway in the paper passage 2. In order to detect the transmission or reflection characteristics of a physical quantity (a transmission rate of light through the paper in this embodiment) of the carried paper, a light source 4 is disposed over the paper 1 carried into the paper passage 2, and an image sensor 5 is disposed under the light source 4. Further, a rotary encoder 6 is provided for the carrying means 3 to output a plurality of pulses in correspondence to the carry distance of the paper 1.

Further, on the inlet side of the paper passage 2, an inlet sensor 7 is disposed to output a paper signal indicative of an insertion of a paper, to control means 8, whenever a paper is inserted into the paper passage 2. The control means 8 controls the entire operation of the paper examining apparatus, except the data processing. In more detail, the control means 8 controls the operation of roller driving means 9 for driving the rollers 3 (i.e., paper carrying means) arranged along the paper passage 2, the light source 4, the image sensor 5, and sensor driving means 10 for activating the image sensor 5, in order to carry the paper 1 and further to detect a signal indicative of the light transmission characteristics through the paper 1.

In operation, when a paper 1 is carried along the paper passage 2, the rotary encoder 6 outputs pulse signals whose number corresponds to the paper carry distance to address detecting means 14. Therefore, the address detecting means 14 counts the number of the pulses to detect an address on the paper 1.

A plurality of addresses (detection points) on the paper are previously set to detection point setting means 12 with the use of a digital switch 11 by an operator. Therefore, match detecting means 13 compares the address detected by the address detecting means 14 with at least one of the addresses set in the detection point setting means 12. When the two compared addresses match each other, the match detecting means 13 closes the switching means 16, so that the output of the image sensor 5 is applied to detected value storing means 19 (e.g., RAM) through an analog-digital converter 17. Further, the detected address is given to reference value holding means 15, to read a previously stored reference value corresponding to the detected address.

Here, the detected value stored in the detected value storing means 19 and the reference value stored in the reference value holding means 15 are both given to comparing means 18. This comparing means 18 is activated in response to an address match signal outputted by the match detecting means 13, and compares the detected value stored in the detected value storing means 19 with the reference value stored in the reference value storing means 15, to detect whether both the values are the same [genuine] or different [counterfeit] from each other.

The comparison result of [genuine] or [counterfeit] of the comparing means 18 is given to deciding means 20 in sequence. Here, since the addresses at the detection points are given from the address detecting means 14 to the deciding means 20, the deciding means 14 stores the comparison results obtained from the comparing means 18 in sequence in relation to the addresses of the detected points. Further, after all the comparison results at all the detection points set in the detection point setting means 12 are synthesized, the deciding means 20 outputs a decision output of [genuine] when the major parts at the detection points are [genuine], but a decision output of [counterfeit] when the major parts at the detection points are [counterfeit].

Figure 2:
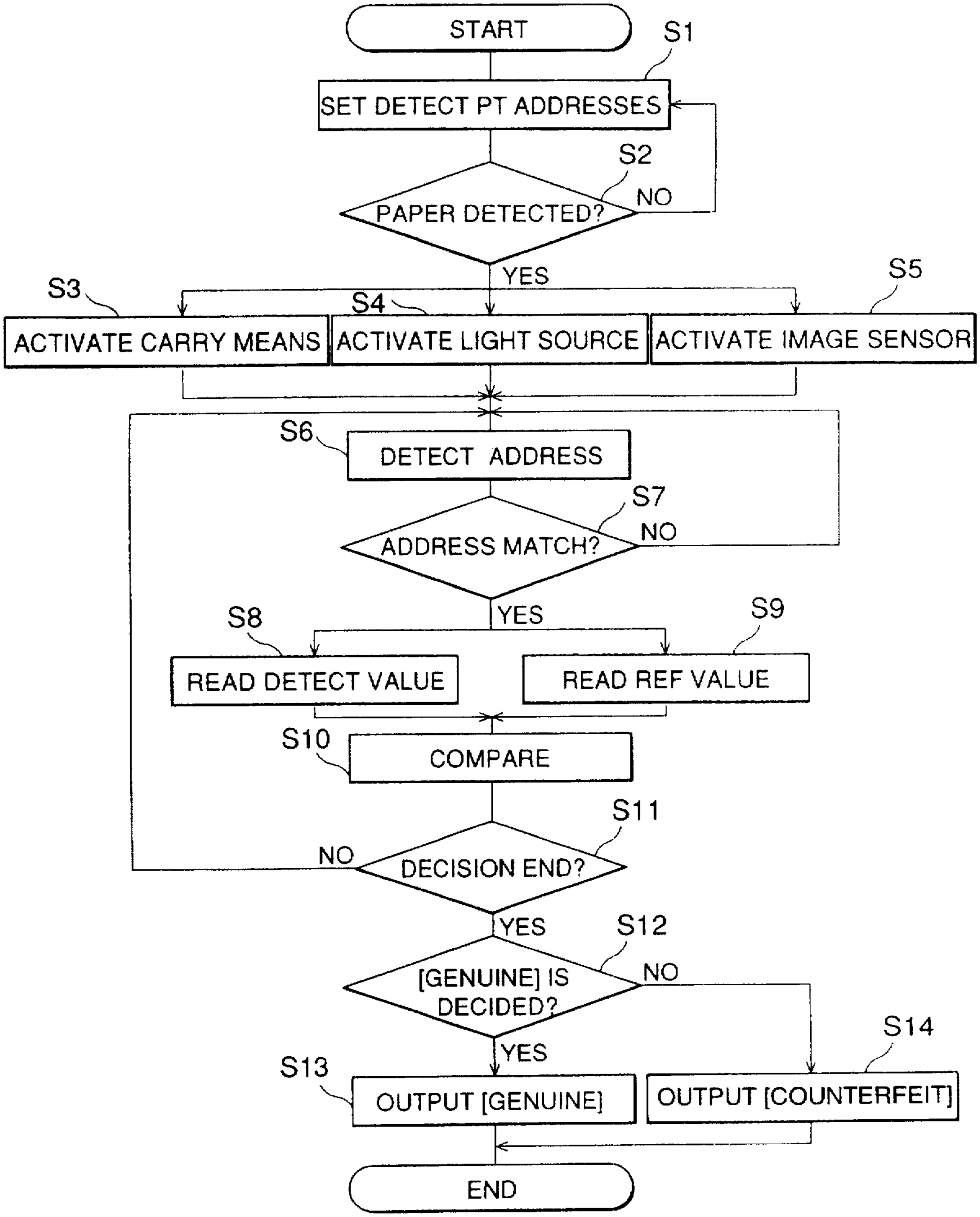
FIG. 2 is a flowchart for assistance in explaining the operation of the paper examining apparatus shown in FIG. 1.

FIG. 2 is a flowchart showing the operation of the paper examining apparatus according to the present invention. Although not included in this flowchart, in this embodiment, a plurality of detection points are previously set according to the kinds of paper to be examined, and the image data at the set detection points are detected in order to decide whether the detected image data are true or false. In this case, it is necessary to previously store the reference values (the light transmission rate, in this embodiment) at the detection points on the paper to be examined, in the reference value holding means 15. Here, the number or the positions of the detection points on the paper are decided according to the sort of the paper to be examined. In the case of a one-thousand yen bill, for instance, an appropriate number and positions of the detection points are previously decided, and the reference values at these detection points are stored in the reference value storing means 15. This reference value storing means 15 is a ROM, for instance. Further, when the ROM has a sufficient memory capacity, it is possible to store all the data related to the entire surface of the bill.

In step S1 of this flowchart, at least one detection point address of a paper to be examined is set by use of the digital switch 11. Here, the number of detection points to be set is decided according to the kind of paper to be examined, that is, according to the precision to be required. The set address is given from the digital switch 11 to the set address detection point setting means 12. Further, set data according to the set detection point address is given to the match detecting means 13. The match detecting means 13 compares the set detection point address data with the detection point address data applied by the address detecting means 14.

Further, when a paper is inserted into the paper examining apparatus, the control means 8 detects the inserted paper, and activates the various means. In more detail, in step S3, the carrying means 3 carries the inserted paper along the paper passage 2. In step S4, the light source 4 illuminates the paper. In step S5, the sensor driving means 10 activates the image sensor 5 to detect image data from the paper.

Accordingly, various detection point address data determined according to the feeding rate of the paper are given in sequence from the rotary encoder 6 to the address detecting means 14. At the same time, image data detected from the surface of the paper are transmitted from the image sensor 5 to the switching means 16.

The detected detection point address data are given from the address detecting means 14 to the match detecting means 13. The match detecting means 13 compares the detected detection point address data with the set detection point address stored in the detection point setting means 12. Further, in step S7, when the match detecting means 13 detects a matching between both, the match detecting means 13 outputs a match signal to the switching means 16 and the comparing means 18.

In step S8, in response to this match signal, the switching means 16 closes the switch, so that the analog signal image data detected by the image sensor 5 are converted into digital signals by the analog-digital converter 17. The converted digital signals are given to the detected value storing means 19.

At the same time, in step S9, in response to this match signal, the comparing means 18 reads the reference values from the reference value holding means 15. Further, in step S10, the comparing means 18 compares the digital signals stored in the detected value storing means 19 with the reference values stored in the reference value holding means 15 in sequence.

In step S11, the control means 8 checks whether the above-mentioned comparison has been executed for all the detection points on the paper, that is, whether the genuineness detection has been completed. If at least one detection point still remains, the above-mentioned steps from step S6 to S10 are repeated. Conversely, if the examination for all the detection points has been completed, the control step proceeds to step S12.

In step S12, the deciding means 20 decides whether the inserted paper is [genuine] or [counterfeit] on the basis of the comparison results of the comparing means 18 at all the detection points. In this case, when the number of matches as the comparison results of the comparing means 18 is more than a predetermined value, in step S13, the deciding means 20 decides that the inserted paper is [genuine]. On the other hand, when the number of matches as the comparison results of the comparing means 18 is the predetermined value or less, in step S14, the deciding means 20 decides that the inserted paper is [counterfeit].

This criterion is decided high or low according to the sorts of paper. In the case of a large denomination note or bill, the criterion is determined high, in order that the bill can be decided [counterfeit] even if there exists a mismatch at one detection point. Further, in the case where a white paper or papers due to misprint are selected, a lower criterion is used.

In the above-mentioned embodiment, although the light transmission characteristics are explained as an example of the transmission or reflection characteristics of a physical quantity, it is of course possible to adopt the light reflection characteristics, instead of the light transmission characteristics.

Further, when a magnetic detection system of transmission characteristic type is used instead of the optical detection system, the light source is replaced with a magnetic field generating means, and further the optical image sensor is replaced with a magnetic sensor.

Further, as already explained, it is preferable to change the number and the positions of the detection points according to the sort of paper to be examined. Further, it is also preferable to change the number and the positions of the detection points for each predetermined number of papers or with the lapse of time, in order to further securely prevent the paper from being decided as being [genuine] erroneously, that is, from being forged.

In the paper examining method and apparatus according to the present invention, when the genuineness of a carried paper is examined by detecting the transmission or reflection of a physical quantity (e.g., light or magnetic flux) obtained through or from the paper, the reference transmission or reflection values of the physical quantity are set for at least one predetermined detection point on the paper; the physical quantity is irradiated upon the paper; the transmission or reflection values are detected at a previously selected number and positions of detection points on the paper; the reference transmission or reflection values at the previously selected number and positions of the detection points are read from the reference transmission or reflection values of the physical quantity; the detected transmission or reflection values of the physical quantity are compared with the read reference transmission or reflection values; and the genuineness of the paper is decided on the basis of the comparison results. Therefore, it is possible to freely select the decision contents (i.e, the detection points on the paper) according to the sorts of papers to be examined. As a result, it is possible to prevent a paper from being decided as [genuine] erroneously when a forger infers the detection points on the paper. Here, however, since the paper is not examined all over the surface thereof, a high speed paper examination can be realized.

Further, since a series of the transmission or reflection values can be detected by irradiating and scanning the physical quantity (e.g., light) upon the paper, it is possible to examine the paper objectively at a high precision, by securely detecting a physically abnormal change point on the paper.

Further, since the previously selected number and positions of the detection points can be changed freely, it is possible to examine the paper on appropriate detection points determined according to the examination speed and precision, and further the kinds of the paper to be examined.

Further, since the number and positions of the detection points can be changed for each predetermined number of the papers, it is difficult for a forger to infer the detection points.

Further, since the number and positions of the detection points can be changed with the lapse of time, it is difficult for a forger to infer the detection points.

What is claimed is:

1. A paper examining method for examining genuineness of a paper in response to physical characteristics of the paper, the method comprising:

setting reference values in connection with the physical characteristics of the paper corresponding to a plurality of predetermined points on the paper;

irradiating the paper with a radiating source;

measuring detection values corresponding to the physical characteristics of the paper from detection points selected from the plurality of predetermined points, wherein a number and positions of the detection points are modified after a predetermined number of papers have been examined;

reading the reference values corresponding to the detection points selected from the plurality of predetermined points;

comparing the detection values and the corresponding reference values for each one of the detection points to output comparison results; and determining the genuineness of the paper on the basis of the comparison results.

2. A paper examining method for examining genuineness of a paper in response to physical characteristics of the paper, the method comprising:

setting reference values in connection with the physical characteristics of the paper corresponding to a plurality of predetermined points on the paper;

irradiating the paper with a radiating source;

measuring detection values corresponding to the physical characteristics of the paper from detection points selected from the plurality of predetermined points, wherein a number and positions of the detection points are periodically modified;

reading the reference values corresponding to the detection points selected from the plurality of predetermined points;

comparing the detection values and the corresponding reference values for each one of the detection points to output comparison results; and determining the genuineness of the paper on the basis of the comparison results.

3. A paper examining apparatus for examining genuineness of a paper in response to physical characteristics of the paper, the apparatus comprising:

distance detecting means for determining a carry distance of the paper;

reference value storing means for storing reference values in connection with the physical characteristics of the paper corresponding to a plurality of predetermined points on the paper;

detection point setting means for setting a number and positions of detection points for measuring detection values corresponding to the physical characteristics of the paper, wherein the number and the positions of the detection points are modified after a predetermined number of papers have been examined;

match detecting means for outputting a match signal when a set signal output by the detection point setting means matches a detection signal output by the distance detecting means;

irradiating means for radiating detectable signals for measuring the physical characteristics of the paper;

detecting means for measuring the detection values corresponding to the physical characteristics of the paper at the detection points;

comparing means for comparing the detection values and the corresponding reference values for each one of the detection points and for outputting comparison results; and deciding means for determining the genuineness of the paper on the basis of the comparison results.

4. A paper examining apparatus for examining genuineness of a paper in response to physical characteristics of the paper, the apparatus comprising:

distance detecting means for determining a carry distance of the paper;

reference value storing means for storing reference values in connection with the physical characteristics of the paper corresponding to a plurality of predetermined points on the paper;

detection point setting means for setting a number and positions of detection points for measuring detection values corresponding to the physical characteristics of the paper, wherein the number and the positions of the detection points are periodically modified match detecting means for outputting a match signal when a set signal output by the detection point setting means matches a detection signal output by the distance detecting means;

irradiating means for radiating detectable signals for measuring the physical characteristics of the paper;

detecting means for measuring the detection values corresponding to the physical characteristics of the paper at the detection points;

comparing means for comparing the detection values and the corresponding reference values for each one of the detection points and for outputting comparison results; and deciding means for determining the genuineness of the paper on the basis of the comparison results.

5. A paper examining apparatus for examining genuineness of a paper in response to physical characteristics of the paper, the apparatus comprising:

an encoder for determining a carry distance of the paper;

a storage device for storing reference values in connection with the physical characteristics of the paper corresponding to a plurality of predetermined points on the paper;

a detection point setting device for setting a number and positions of detection points for measuring detection values corresponding to the physical characteristics of the paper, wherein the number and the positions of the detection points are changeable;

a match detection device for outputting a match signal when a set signal output by the detection point setting means matches a detection signal output by the encoder;

an irradiating device radiating detectable signals for measuring the physical characteristics of the paper;

a detection device for measuring the detection values corresponding to the physical characteristics of the paper at the detection points;

a comparator for comparing the detection values and the corresponding reference values for each one of the detection points and for outputting comparison results; and an output device for determining the genuineness of the paper on the basis of the comparison results.

6. A paper examining apparatus of claim 5, wherein the number and the positions of the detection points are modified after a predetermined number of papers have been examined.

7. A paper examining apparatus of claim 5, wherein the number and the positions of the detection points are periodically modified.

* * * * *